United States Patent
Chang et al.

(10) Patent No.: US 8,254,709 B2
(45) Date of Patent: Aug. 28, 2012

(54) VARIABLE LENGTH ENCODING DEVICE OF IMAGE COMPRESSION SYSTEM

(75) Inventors: Chih Yu Chang, Taichung County (TW); Tzyh Chiang Oscal Chen, Chiayl County (TW)

(73) Assignee: Industrial Technology Research Institute, Hsinchu (TW)

( * ) Notice: Subject to any disclaimer, the term of this patent is extended or adjusted under 35 U.S.C. 154(b) by 427 days.

(21) Appl. No.: 12/639,696

(22) Filed: Dec. 16, 2009

(65) Prior Publication Data
US 2011/0142357 A1    Jun. 16, 2011

(51) Int. Cl.
G06K 9/46    (2006.01)
G06K 9/36    (2006.01)

(52) U.S. Cl. ........ 382/246; 382/232; 382/244; 382/245; 382/247

(58) Field of Classification Search .......... 382/232, 382/244–247
See application file for complete search history.

(56) References Cited

U.S. PATENT DOCUMENTS

| | | | | |
|---|---|---|---|---|
| 4,363,036 | A | * | 12/1982 | Subramaniam ............... 382/238 |
| 4,816,914 | A | | 3/1989 | Ericsson |
| 5,751,232 | A | * | 5/1998 | Inoue et al. .................... 341/63 |
| 5,956,430 | A | * | 9/1999 | Kunitake et al. .............. 382/246 |
| 6,915,014 | B1 | * | 7/2005 | Honma et al. ................. 382/239 |
| 7,102,551 | B2 | * | 9/2006 | Takakura et al. ............... 341/67 |
| 7,224,844 | B2 | * | 5/2007 | Otsuka .......................... 382/239 |
| 7,894,532 | B2 | * | 2/2011 | Otsuka .................... 375/240.23 |
| 8,145,000 | B2 | * | 3/2012 | Hagiwara ..................... 382/232 |
| 2008/0307198 | A1 | * | 12/2008 | Kataoka et al. ................. 712/28 |

* cited by examiner

*Primary Examiner* — Bhavesh Mehta
*Assistant Examiner* — Utpal Shah
(74) *Attorney, Agent, or Firm* — Morris Manning & Martin LLP; Tim Tingkang Xia, Esq.

(57) ABSTRACT

A variable length encoding (VLE) device of an image compression system is suitable for encoding transformed and quantized block image signals. The VLE device includes a plurality of encoding modules, for performing VLE on the block image signals; and a selection module (VLE module start controller), for selecting a number of the encoding modules in turn to encode the block image signals. The encoding modules are configured for parallel processing, and an operating frequency of each of the encoding modules is a fractional frequency of a throughput rate of the image compression system. The VLE device is not affected by the time consumed by the VLE in the image compression process, and enables the entire image compression system to operate as desired and achieve the required throughput rate.

9 Claims, 4 Drawing Sheets

VARIABLE LENGTH ENCODING DEVICE OF IMAGE COMPRESSION SYSTEM

BACKGROUND

1. Technical Field

The present disclosure relates to a hardware image compression system, and more particular to hardware architecture of a variable length encoding (VLE) device of a hardware image compression system.

2. Related Art

Generally speaking, image compression usually involves three main steps, namely, transform, quantization, and encoding. Transform means transforming original image data (for example, original image data represented in the YUV (YCbCr) system) into another representation, and the original image data can be recovered from the transformed data through inverse transform. The transform aims at removing spatial redundancy. For example, transform methods include Discrete Cosine Transform (DCT) used in the video image compression process of MPEG-2 images. Common encoding methods include statistics-based run length encoding (RLE) and entropy encoding.

For dynamic image compression, an image is usually divided into a plurality of 16*16 pixel macro-blocks (MBs), and each MB is further divided into four 8*8 blocks, which are basic units for image compression. The DCT is performed in a unit of an 8*8 block, and after the DCT is completed, the DCT coefficient is still an 8*8 matrix. In Microsoft VC-1, each 8*8 block is further divided into 8*8, 8*4, 4*8, and 4*4 subblocks for the RLE. The transformed block image is then transformed into a sequence of block image signals by quantization and zigzag transform, and afterward, the sequence of block image signals is encoded. Both the RLE and entropy encoding belong to the VLE, and thus require more time than the DCT, quantization, DC/AC prediction, and zigzag transform.

For a typical hardware image compression system, the entire hardware system is divided into a plurality of image processing modules for respectively performing different image compression steps, such as a transform module, a quantization module and other possible image processing modules, and the image processing modules are respectively started by an operating procedure of the image compression system in sequence to perform different image compression steps on block images, for example, published U.S. Pat. No. 4,816,914 entitled "Method and apparatus for efficiently encoding and decoding image sequences". Generally speaking, the image processing modules are different in terms of computational complexity and time, and particularly, the encoding step in the image compression system has a higher computational complexity than other steps, and thus requires more processing time than processing steps such as the DCT, quantization, DC/AC prediction, and zigzag transform, such that the operating rate of the entire hardware image compression system depends on the VLE module, thereby affecting the throughput rate of the image compression system.

SUMMARY

Accordingly, the present disclosure provides a VLE device of an image compression system.

An embodiment of the device of the present disclosure comprises: a plurality of encoding modules configured for parallel processing, for performing VLE on block image signals, in which an operating frequency of each of the encoding modules is a fractional frequency of a throughput rate of the image compression system; and a selection module (start controller), for selecting the encoding modules in turn to encode the block image signals.

Another embodiment of the device of the present disclosure comprises: a plurality of encoding modules configured for parallel processing, for performing VLE on block image signals, in which an operating frequency of each of the encoding modules is a fractional frequency of a throughput rate of the image compression system; a calculation module, for calculating and determining a number of the encoding modules according to related parameters and the throughput rate set by the image compression system; and a selection module, for selecting the determined number of the encoding modules in turn to encode the block image signals.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

Figure 1:
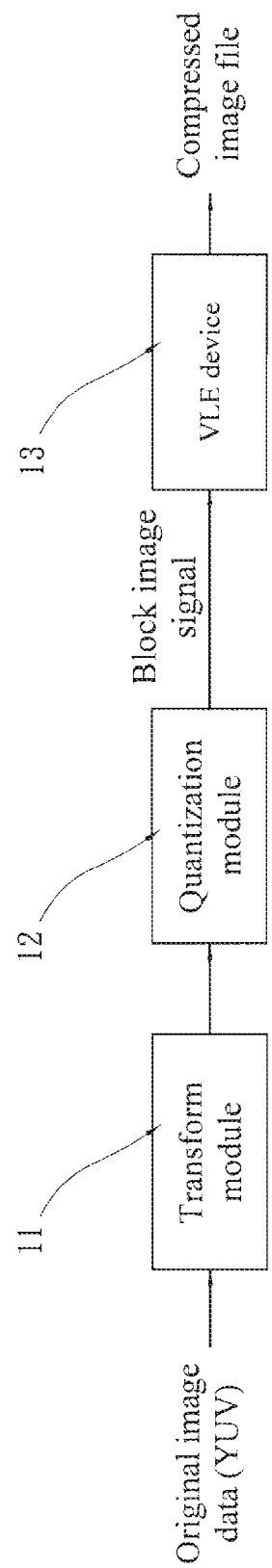
FIG. 1 shows hardware architecture of a typical dynamic image compression system.

FIG. 1 shows hardware architecture of a typical dynamic image compression system. Referring to FIG. 1, original image data before encoding, for example, represented in the YUV (YCbCr) system, is input to a transform module 11 and transformed from the temporal domain to the frequency domain. A typical transform algorithm may be the DCT, Wavelet Transform, or Discrete Wavelet Transform. In the transform process, generally, the image is firstly divided into non-overlapping block images, and then transformed in the unit of a block image. Next, the transformed block images are input to a quantization module 12 for quantization. The quantization process may be performed through a method such as zigzag transform, so as to transform the block images in the data matrix format into a sequence of block image signals. Afterward, the block image signals are sequentially input to a VLE device 13 for encoding, after which a compressed image file is generated. Techniques or algorithms for transforming, quantizing, and encoding the original image data vary with different image compression specifications. Common image compression specifications include MPEG-1, MPEG-2, H.264, VC-1, and the like.

For a typical hardware image compression system, the entire hardware image compression system is divided into a plurality of image processing modules for respectively performing different image compression steps. Therefore, irrespective of the image compression specification, the requirements can be met by setting corresponding algorithms in the image processing modules, which should be understood by persons skilled in the art.

Figure 2:
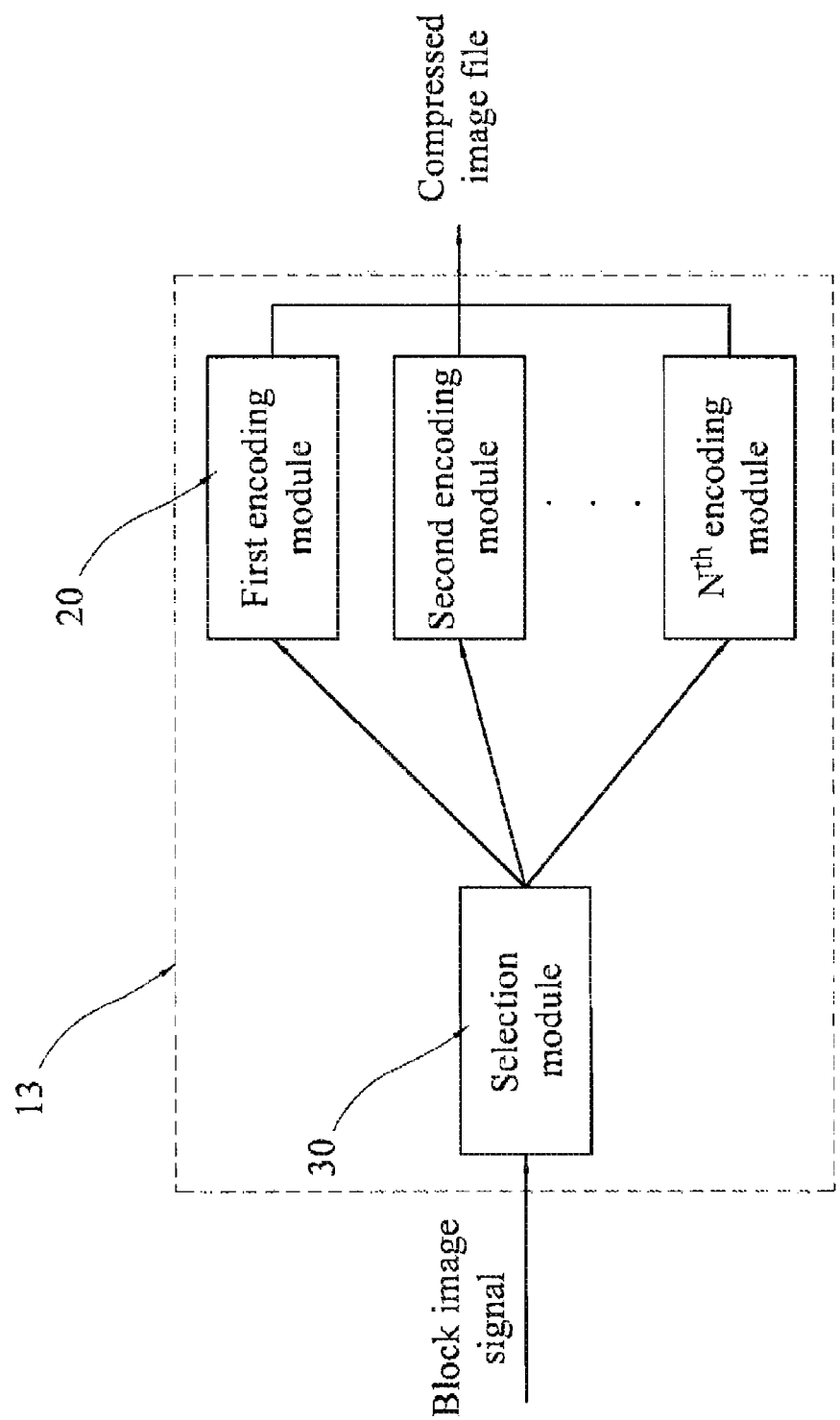
FIG. 2 shows hardware architecture of a VLE device according to an embodiment of the present disclosure.

The VLE device 13 of the present disclosure is suitable for performing VLE on transformed and quantized block image signals. FIG. 2 shows hardware architecture of the VLE device 13 according to an embodiment of the present disclosure. Referring to FIG. 2, the VLE device 13 comprises a plurality of encoding modules 20 and a selection module 30 (VLE module start controller).

The encoding modules 20 are configured for parallel processing. Each encoding module 20 may be implemented by a micro control unit (MCU) with a built-in algorithm, or other similar hardware elements. The encoding modules 20 are used for performing VLE on the quantized block image signals. An operating frequency of each encoding module 20 is a fractional frequency of a throughput rate of the entire image compression system.

The selection module 30 (VLE module start controller) is used for selecting the encoding modules 20 in turn to perform VLE on the block image signals.

A number M of the encoding modules 20 is calculated and determined according to related parameters and the throughput rate set by the entire image compression system. It is assumed that the throughput rate of the image compression system is f1, images to be compressed have a size of A*B pixels and are compressed at a rate of N frames/sec, and the image compression system further comprises other image processing modules (including the transform module 11, the quantization module 12, and other possible image processing modules) in addition to the VLE device 13. Firstly, processing time required by each image processing module for processing each block image is calculated, and a maximum processing time T1 is selected. In another word, the processing time required by each of the other image processing modules (including the transform module 11, the quantization module 12, and other possible image processing modules) except the VLE device 13 is smaller than or equal to T1. In other words, T1 is a maximum processing time equal to or greater than the processing time required by each of the other image processing modules. Then, a maximum processing time T2 required by the VLE device 13 for processing each block image signal is calculated. Afterward, the number of the required encoding modules 20 is determined by using the following Equation (1) and Equation (2), and the operating frequency f2 of each encoding module 20 is determined through the following Equation (3).

$$(T1*(N-1)) < T2 <= (T1*N) \quad \text{Equation (1)}$$

$$N <= M (M \text{ and } N \text{ are integers}) \quad \text{Equation (2)}$$

$$f2 = f1/M \quad \text{Equation (3)}$$

For example, a clock of the image compression system is used as a unit for calculating T1 and T2 in the above processing operations. Assuming that T1=8 clock cycles and T2=15 clock cycles, it can be calculated according to Equation (1) that N=2 (N is an integer), and then it can be determined according to Equation (2) that M is greater than or equal to 2 (2<=M), indicating that two encoding modules 20 are required. Accordingly, the operating frequency of each encoding module 20 is f2=f1/2. Although two encoding modules 20 are required according to above calculation, N is not an upper limit, but a lower limit for the number of the encoding modules 20. In other words, user may utilize more than 2 encoding modules 20 in the above example to achieve the same function and performance.

Example

Figure 3:
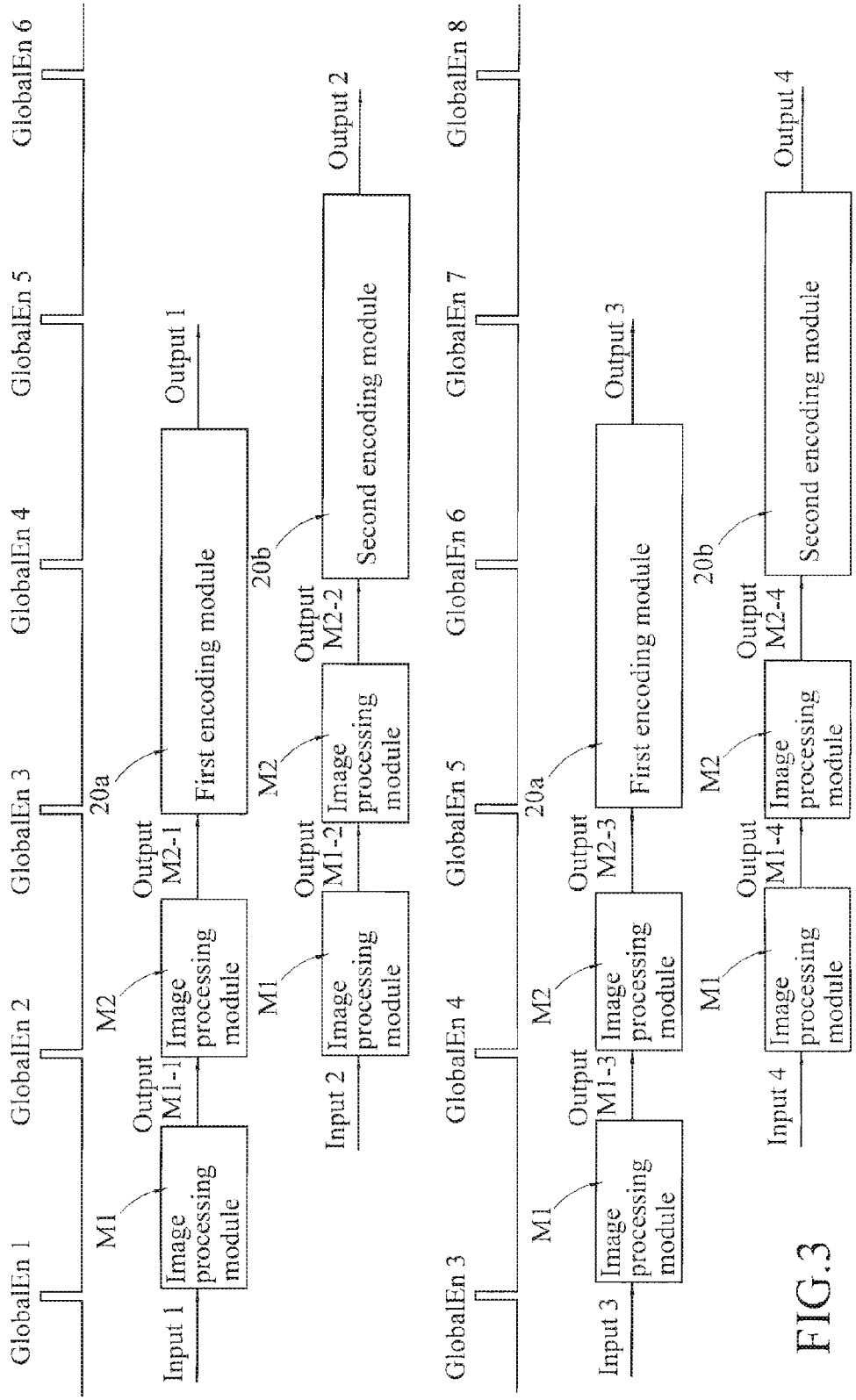
FIG. 3 shows an operational process of the image compression system with an example of the image compression system using two encoding modules and two additional image processing modules.

FIG. 3 shows an operational process of the image compression system with an example of the image compression system using two encoding modules 20a, 20b and two additional image processing modules M1, M2. The image compression system inputs a block image to the first image processing module M1 as input data Input at each starting time point GlobalEn, the block image is sequentially compressed through different image compression steps performed by the image processing module M2 and the encoding module 20a or 20b selected by the selection module 30 in turn, and is finally output as a compressed image encoding signal Output. Here, a time interval between any two neighboring starting time points GlobalEn is the maximum processing time T1.

Referring to FIG. 3, at a first starting time point GlobalEn 1, a first input Input 1 starts the module M1; at a second starting time point GlobalEn 2, a second input Input 2 starts the module M1, and an output Output M1-1 of the module M1 (representing an output signal obtained after the first input Input 1 is processed by the module M1) is an input of the module M2 and starts the module M2; at a third starting time point GlobalEn 3, a third input Input 3 starts the module M1, an output Output M1-2 of the module M1 (representing an output signal obtained after the second input Input 2 is processed by the module M1) is an input of the module M2 and starts the module M2, and an output Output M2-1 of the module M2 (representing an output signal obtained after the first input Input 1 is processed by the module M2) is an input of the first encoding module 20a and starts the first encoding module 20a; at a fourth starting time point GlobalEn 4, a fourth input Input 4 starts the module M1, an output Output M1-3 of the module M1 (representing an output signal obtained after the third input Input 3 is processed by the module M1) is an input of the module M2 and starts the module M2, and at this time, the selection module 30 selects the second encoding module 20b to perform VLE, and an output Output M2-2 of the module M2 (representing an output signal obtained after the second input Input 2 is processed by the module M2) is an input of the second encoding module 20b and starts the second encoding module 20b. Thus, after at a fifth GlobalEn, the selection module 30 selects the two encoding modules 20a and 20b in turn to perform VLE on the block image signals, and the entire image compression system outputs a group of compressed image encoding signals Output every other starting time point GlobalEn.

Figure 4:
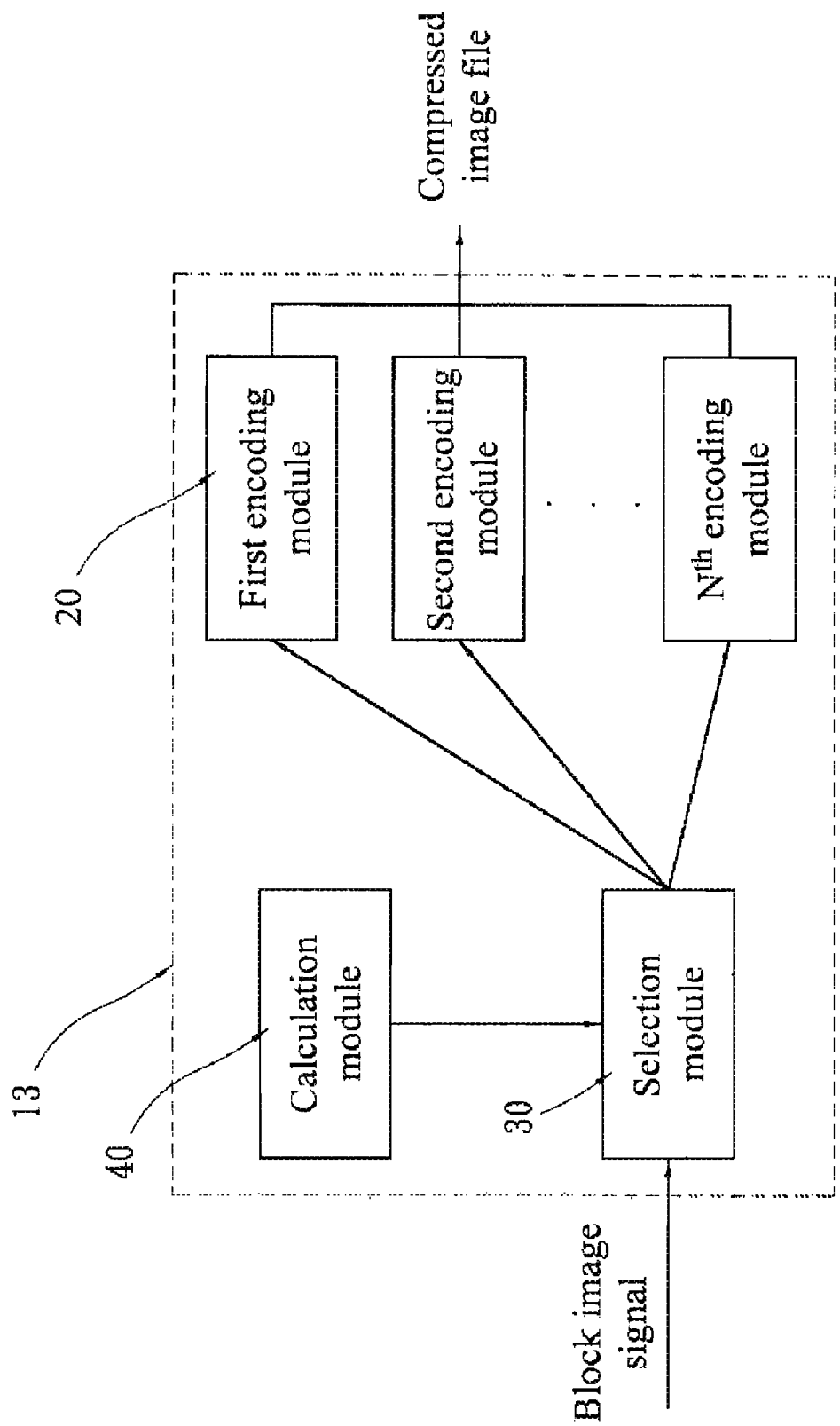
FIG. 4 shows hardware architecture of a VLE device according to another embodiment of the present disclosure.

FIG. 4 shows hardware architecture of the VLE device 13 according to another embodiment of the present disclosure. Referring to FIG. 4, the VLE device 13 further comprises a calculation module 40 for calculating and determining a number of the encoding modules 20 according to related parameters and the throughput rate set by the image compression system. In this embodiment, a plurality of encoding modules 20 is preconfigured in the VLE device 13 of the image compression system. Before the image compression process is started, the calculation module 40 firstly determines the number of the required encoding modules 20 and the operating frequency f2 of each encoding module 20 according to the related parameters and the throughput rate set by the image compression system by using Equation (1) and Equation (2). The calculation module 40 transmits the calculated number of the encoding modules 20 to the selection module 30, and according to the determined number of the encoding modules 20, the selection module 30 automatically selects the determined number of the encoding modules 20 in turn to perform VLE on the block image signals transmitted from the previous image processing module M2.

To sum up, since the VLE device 13 of the present disclosure uses a plurality of parallel processing encoding modules 20 to perform VLE on the block image signals transmitted from the previous image processing module, and the operating frequency of each encoding module 20 is a fractional frequency of the throughput rate of the entire image compression system, the VLE device is not affected by the time consumed by VLE in the image compression process, and enables the entire image compression system to operate as desired and achieve the required throughput rate.

What is claimed is:

1. A variable length encoding (VLE) device of an image compression system, suitable for performing VLE on block image signals transformed and quantized by other image processing modules, the VLE device comprising:

a plurality of encoding modules configured for parallel processing, for performing the VLE on the block image signals, wherein an operating frequency of each of the encoding modules is a fractional frequency of a throughput rate of the image compression system, wherein a number M of the encoding modules is determined by using following Equation (1) and Equation (2):

$$(T1*(N-1)) < T2 <= (T1*N) \quad \text{Equation (1)},$$

$$N <= M \ (M \text{ is an integer}) \quad \text{Equation (2)},$$

wherein T1 is a maximum processing time equal to or greater than a processing time required by each of the other image processing modules, and the T2 is a maximum processing time required by the VLE device for processing each of the block image signals; and a selection module, for selecting the encoding modules in turn to perform the VLE on the block image signals.

2. The VLE device of the image compression system according to claim 1, wherein each of the encoding modules is a micro control unit (MCU) with a built-in algorithm.

3. The VLE device of the image compression system according to claim 1, wherein the operating frequency f2 of each of the encoding modules is determined by using a following Equation (3):

$$f2=f1/M \quad \text{Equation (3)};$$

wherein the f1 is the throughput rate of the image compression system.

4. The VLE device of the image compression system according to claim 1, wherein the image compression system inputs a block image to the other image processing modules as input data at each starting time point, the block image is sequentially compressed through different image compression steps performed by the other image processing modules and the encoding modules selected by the selection module in turn, and is finally output as a compressed image encoding signal, and a time interval between any two neighboring starting time points is the maximum processing time T1.

5. A variable length encoding (VLE) device of an image compression system, suitable for performing VLE on block image signals transformed and quantized by other image processing modules, the VLE device comprising:

a plurality of encoding modules configured for parallel processing, for performing the VLE on the block image signals, wherein an operating frequency of each of the encoding modules is a fractional frequency of a throughput rate of the image compression system;

a calculation module, for determining a number of the encoding modules to be used; and a selection module, for selecting the determined number of the encoding modules in turn to perform the VLE on the block image signals.

6. The VLE device of the image compression system according to claim 5, wherein each of the encoding modules is a micro control unit (MCU) with a built-in algorithm.

7. The VLE device of the image compression system according to claim 5, wherein the calculation module determines a number M of the encoding modules to be used by using following Equation (1) and Equation (2):

$$(T1*(N-1)) < T2 <= (T1*N) \quad \text{Equation (1)};$$

$$N <= M \ (M \text{ is an integer}) \quad \text{Equation (2)};$$

wherein T1 is a maximum processing time equal to or greater than a processing time required by each of the other image processing modules; and the T2 is a maximum processing time required by the VLE device for processing each of the block image signals.

8. The VLE device of the image compression system according to claim 7, wherein the operating frequency f2 of each of the encoding modules is determined by using a following Equation (3):

$$f2=f1/M \quad \text{Equation (3)};$$

wherein the f1 is the throughput rate of the image compression system.

9. The VLE device of the image compression system according to claim 7, wherein the image compression system inputs a block image to the other image processing modules as input data at each starting time point, the block image is sequentially compressed through different image compression steps performed by the other image processing modules and the encoding modules selected by the selection module in turn, and is finally output as a compressed image encoding signal, and a time interval between any two neighboring starting time points is the maximum processing time T.

* * * * *